Nov. 19, 1940. A. W. STATLER 2,222,380
COMBINATION FEED GRINDER AND MIXER
Filed Jan. 8, 1940
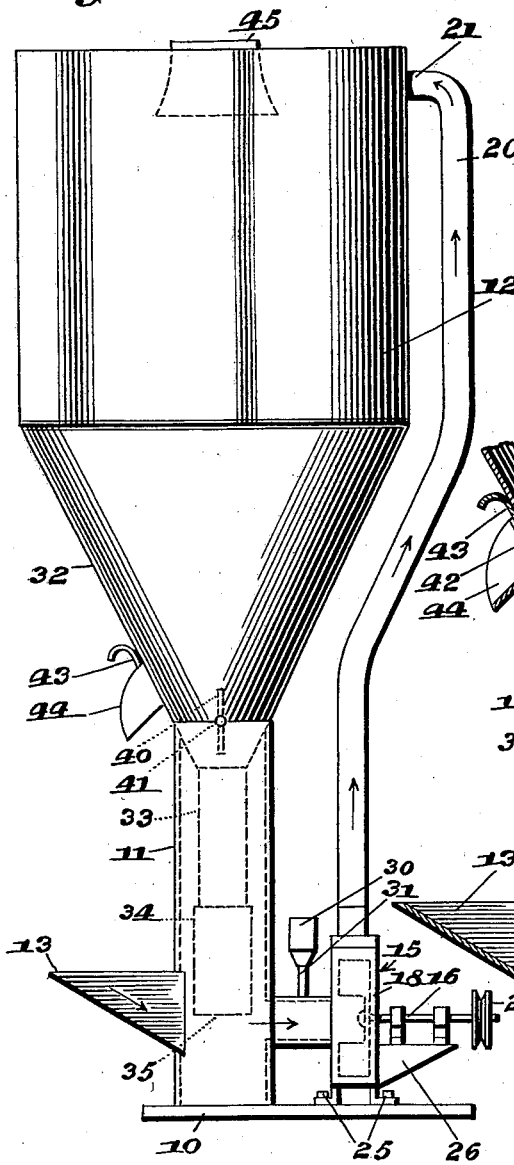
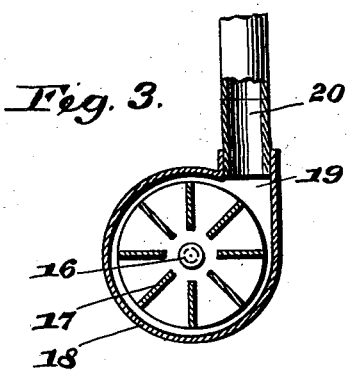
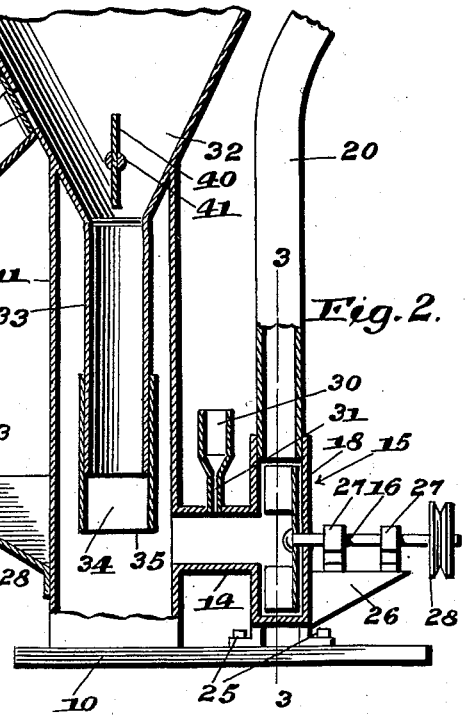
Inventor
A. W. Statler
By Munn, Anderson & Liddy
Attorneys Patented Nov. 19, 1940

2,222,380

UNITED STATES PATENT OFFICE 2,222,380

COMBINATION FEED GRINDER AND MIXER

Arthur W. Statler, Denver, Colo

Application January 8, 1940, Serial No. 313,002

1 Claim. (Cl. 83—93)

This invention relates to a device for grinding and mixing feeds.

An object of the invention is the provision of a device in which various ingredients are fed to a centrifugal blower which not only mixes and forces the ingredients upwardly into a mixing chamber but which cuts up or grinds the ingredients into small particles so that when they are blown in the mixing chamber they will be in such condition that they will be readily mixed.

A further object of the invention is the provision of a device for not only intimately mixing a number of ingredients but for cutting up lumps and larger particles of the ingredients after which the ingredients are blown into an enclosed space whereby the ingredients will be intimately mixed and are ready then for disposal.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

In the drawing:

Fig. 1 is a view in elevation of my combined mixer and grinder,

Figure 2 is a fragmentary enlarged vertical section of the device, and

Figure 3 is a transverse vertical section taken along the line 3—3 of Fig. 1.

Referring more particularly to the drawing, 10 designates a base member upon which is mounted a housing 11 which forms a support for a tank 12.

A chute 13 extends through an opening in the side wall of the housing 11 and directly opposite a conduit 14 which also communicates with the housing. The ingredients are fed into the upper open end of the chute 13 and are discharged into the housing whereby they are drawn into the conduit 14 by means of a centrifugal blower, generally designated by the numeral 15.

The blower is shown more particularly in Fig. 3 and this blower consists of a driven shaft 16 with vanes 17 attached thereto and terminating adjacent the inner periphery of a circular housing 18. This housing is provided with a discharge spout 19 which is in communication with the lower end of a blower pipe 20. The upper end of the pipe, as shown at 21, opens into the upper end of the tank 12 which forms a mixing chamber as will be presently described.

The blower is mounted on the base member 10, as shown at 25. A bracket 26 extends from the housing 18 and supports bearings 27 of the shaft 16. A pulley 28 is secured to the outer end of the shaft and is driven in any approved manner.

A cup 30 is connected by a pipe 31 with the interior of the conduit 14 and this cup is adapted to be supplied with oils or other liquids which are drawn through the conduit 14 by the suction of the blower 15. This liquid is thoroughly mixed with the ingredients by the revolving blade 17 of the centrifugal blower. These blades not only draw in the ingredients and force them through the pipe 20 but any lumps of the ingredients are ground up and any of the ingredients which are larger than are desired are also ground up by the revolving blades. The other ingredients may be meat or grains.

The lower end of the tank 12, as shown at 32, is cone-shaped and has its lower end seated within the upper end of the housing 12. A discharge pipe 33 is connected to the lower reduced end of the member 32 and terminates above the upper end of the conduit 14. A sleeve 34 is slidably mounted on the lower end of the discharge pipe and this sleeve is adapted to be adjusted to various heights so that its lower end 35 may be properly positioned with respect to the diameter of the conduit 14 so that the materials issuing from the discharge pipe 33 will enter the conduit 14 under the suction of the blower 15.

A valve 40 is mounted on the shaft 41 and this shaft extends to the exterior of the member 32 so that it can be manually operated for closing or opening the valve 40 when desired.

The member 32 has a discharge opening 42 which is normally closed by a gate valve 43 which is adapted to be raised to permit the mixed ingredients from the tank 12 to be discharged and placed in bags or containers when desired. A spout 44 embraces the opening 42 for directing the ingredients away from the opening. While the spout 44 is shown located above the chute 13, nevertheless it may be placed at right angles to a plane passing through the chute 13 for the convenience of operation.

A dust collector 45 is mounted in an opening in the upper end of the tank 12 and is adapted to prevent dust from the feed tank from escaping to the air.

The operation of my device is as follows: The ingredients are fed to the chute 13 in the proper proportions. After the centrifugal blower 15 has been set in operation these ingredients will then be drawn through the conduit 14 and into the blower where they are not only ground into fine particles but they are mixed and forced upwardly through the pipe 20 and into the tank 12.

The valve 40 remains open initially so that the ingredients which enter the tank may be discharged into the path of suction in the conduit 14 and be drawn again through the blower and then forced into the tank 12. However, when the device is functioning properly after the initial stages the valve 40 is closed for collecting the material.

From time to time the gate valve 43 is raised to permit the ingredients collected in the tank 12 to be discharged and bagged.

When it is desired to add liquids to the ingredients the liquids are supplied in the proper proportions through the cup-shaped member 30 through the pipe 31 into the conduit 14. Due to the churning action of the blades of the blower 15 the liquids are then thoroughly mixed with the ingredients before the mixed ingredients are carried to the upper end of the tank 12.

I claim:

A combined feed grinder and mixer comprising a mixing tank having a discharge opening at the lower end, a discharge pipe projecting downwardly from the lower open end of the tank, a housing secured to the lower portion of the tank and located in spaced relation with the pipe, a centrifugal blower-grinder, a conduit connecting the inlet end of the blower-grinder with the housing below the end of the discharge pipe, means feeding ingredients to the housing and directly towards the conduit so that the ingredients to be mixed and ground will be carried into the blower-grinder, a blower pipe connecting the discharge end of the blower-grinder with the upper end of the tank for conducting the mixed and ground ingredients from the blower-grinder to the tank, means controlling the flow of the mixed ingredients from the tank to the incoming ingredients in the housing through the discharge pipe, a sleeve slidably mounted on the lower end of the discharge pipe and movable upwardly or downwardly so that the free end of the sleeve may be moved towards or away from the inlet end of the conduit where it opens into the housing, and means operating the blower-grinder.

ARTHUR W. STATLER.